Jan. 11, 1955

J. K. BRUCE ET AL 2,699,264

PALLET LOADER

Filed Sept. 22, 1949

JOHN K. BRUCE, AND
HAROLD J. BLACK
INVENTORS

BY Theodore E. Simonton
ATTORNEY

Jan. 11, 1955

J. K. BRUCE ET AL

2,699,264

PALLET LOADER

Filed Sept. 22, 1949

JOHN K. BRUCE, AND
HAROLD J. BLACK
INVENTORS

Theodore E. Simonton
ATTORNEY

Jan. 11, 1955

J. K. BRUCE ET AL 2,699,264

PALLET LOADER

Filed Sept. 22, 1949

JOHN K. BRUCE, AND
HAROLD J. BLACK
INVENTORS

*Theodore E. Simonton*
ATTORNEY

Jan. 11, 1955  J. K. BRUCE ET AL  2,699,264
PALLET LOADER
Filed Sept. 22, 1949

JOHN K. BRUCE, AND
HAROLD J. BLACK
INVENTORS

*Theodore E. Simonton*
ATTORNEY

United States Patent Office 2,699,264
Patented Jan. 11, 1955

2,699,264

PALLET LOADER

John K. Bruce, South Pasadena, and Harold J. Black, Los Angeles, Calif., assignors to Production Aids Incorporated, Los Angeles, Calif., a corporation of California Application September 22, 1949, Serial No. 117,238

6 Claims. (Cl. 214—6)

This invention relates to an improved pallet loading machine embodying apparatus for automatically positioning a layer of containers on a pallet being loaded. In the loading of containers on a pallet preparatory to shipment or storage, it is important that the containers be properly positioned upon the pallet so that the pallet may be more readily transported and stored. It is also important that the several layers of containers on a single pallet be interlocked in order to form a more stable load. With containers that are rectangular in top plan, this interlocking may usually be accomplished by having different patterns for alternate layers, but with square-top containers, it is desirable to offset alternate layers to obtain interlocking. Such offsetting likewise requires accurate positioning of the layers on the pallet.

The principal object of the present invention, accordingly, is to provide automatic means for accurately positioning each layer of containers on the pallet. Another object is to provide means whereby the pallet loading machine may be quickly and easily adapted for loading of runs of containers of various sizes and shapes on a standard-sized pallet without laborious and time-consuming manual adjustments. A further object is to provide means for interlocking loads of square-top containers on a pallet by automatically offsetting alternate layers. A still further object is to provide layer closing means so that the containers in each layer are closely packed together to form a firmer and more stable load.

Other objects and advantages of the present invention will be apparent from the following description, taken in conjunction with the accompanying drawings, in which.

Figure 1:
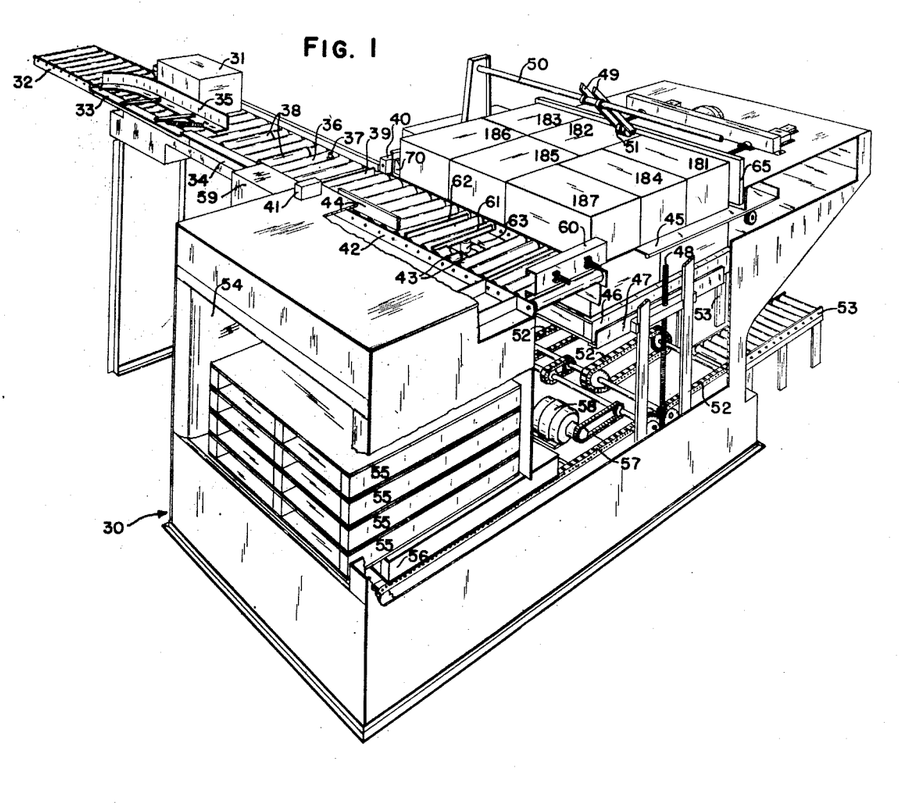
Figure 1 is a perspective view of a pallet loading machine according to this invention, parts being broken away.

The pallet loader 30 shown in Figure 1 of the drawings is of the type disclosed in the prior application of John K. Bruce, Serial No. 5,850, filed February 2, 1948, now Patent 2,633,251. In general, the pallet loader of that application comprises an entering conveyor for delivering cartons or containers successively to a loading platform; means associated with the entering conveyor for rotating pre-selected cartons through 90°, to produce a predetermined arrangement of a file of cartons on the loading platform; a ram for transferring said file of cartons from the loading platform to a stripper plate; a pallet magazine; a pallet elevator; means for transferring an empty pallet from the magazine to the elevator; means for raising the elevator with an empty pallet thereon to a position immediately beneath the normal position of the stripper plate; means for withdrawing the stripper plate when a complete layer of cartons has been rammed thereon to deposit said layer on the pallet; means for lowering the elevator a distance substantially equal to the thickness of said layer; means for returning the stripper plate to its normal position; means for repeating the foregoing operations to complete the loading of the pallet; means for discharging the fully loaded pallet from the machine; and electrical control mechanism for governing the foregoing operations and their repetitions. The electrical control mechanism includes a counting chain which may comprise a plurality of relays or a stepping switch, each unit or step of the counting chain corresponding to the entrance of a single carton into the machine so that the operation of the machine is fully automatic.

Referring more particularly to the drawings, Figure 1 shows a carton or container 31 entering the left side of the pallet loader 30 over the power-operated, entering conveyors 32, 33 and 34. Each of these entering conveyors is operated at a higher speed than the preceding one, which serves in the known manner to space the cartons entering the machine from each other should they be closely packed when delivered to the conveyor 32. The conveyors 32, 33 and 34 are normally continuously running during the operation of the machine.

The above-mentioned mechanism for rotating pre-selected cartons through 90°, as shown in Figure 1, comprises a deflector rail 35 and a rotate pin 37 cooperating with the powered rolls 38 of conveyor 34. The deflector rail 35 deflects the entering cartons to the left-hand side of conveyor 33, and carton 31 is shown in the position resulting from such deflection. Assuming that the carton 31 is a carton to be turned, the rotate pin 37, which is located between two of the idler rolls of conveyor 34, is raised by the control mechanism into position to engage the left front corner of carton 31. This corner of the carton 31 is thus held from advancing while the power rolls 38 force the carton 31 to rotate 90° about pin 37.

As the carton 31 continues to advance, it passes over the entrance gate 39, then in its lowered position, and between the electric eye 40 and its light source 41. The interruption of the beam of light impinging upon the electric eye 40 from the light source 41 conditions the counting chain for actuation one step, the step-wise progression preferably being made after the carton 31 has passed the electric eye 40 and the light beam from the source 41 again impinges upon the electric eye.

The carton rotating means, the entrance gate 39 and the electric eye 40 just described, differ substantially from the corresponding mechanisms of said Bruce application, and are fully described and claimed in application Serial No. 123,932, filed October 27, 1949, by Orrin R. Broberg and Harold E. Vorhis. So far as the present invention is concerned, the particular construction of these features is not material, and the corresponding mechanisms of said Bruce application could equally well be used. Hence these features will not be described in detail herein.

Just beyond the entrance gate 39 and so situated and constructed as to be a continuation of the entering conveyor 34, is the loading platform 42, some of the rolls 43 of which are also power operated. When the predetermined number of cartons necessary to form a file on the loading platform as above described, has passed the electric eye 40, the entrance gate 39 is automatically raised by the electric control mechanism, thus temporarily barring the passage of further cartons to the loading platform. The ram 44 is then automatically operated to push the file of cartons from the loading platform 42 onto the stripper plate 45. After the return of the ram 44, the entrance gate 39 is lowered, another file of cartons assembled on the loading platform 42, and the operations repeated until a full layer of cartons has been built up on the stripper plate 45.

As shown in Figure 1, a full layer of cartons has been built up on the stripper plate 45, and the stripper plate is illustrated as partially withdrawn in the act of depositing the layer of cartons on a layer of cartons previously built up and deposited on the pallet 46. The carton 31 is therefore the first carton of a third layer to be formed.

The pallet 46 being loaded in Figure 1 is supported on an elevator 47 operated by an elevator screw 48. After the stripper plate 45 has been completely withdrawn, and its layer of cartons deposited on the preceding layer on the pallet 46, the elevator screw 47 is automatically operated to lower the elevator 47 and the pallet 46 a distance substantially equal to the height of the cartons. The extent of this lowering movement is governed by the hanger arms 49 pivotally mounted on the cross rod 50 and carrying at their lower ends a roller 51 adapted to bear on the tops of the cartons, the hanger arms serving to operate a switch in the electric control mechanism. The stripper plate is then returned to its original, normal position, ready to receive another layer of cartons. When the pallet 46 is fully loaded, and the elevator 47 is in its bottom position, the loaded pallet 46 is picked up by the chains 52 and carried out of the machine to the exit conveyor 53.

The above-mentioned pallet magazine is shown at 54 at the front of the machine, partially loaded with empty pallets 55. Immediately below and a little to the rear of the pallets 55 stacked in the magazine 54, is shown an empty pallet 56 previously released from the magazine and resting on a pair of chains 57, one of which can be seen at the right side of the pallet loader 30. The chains 57 carry the pallet 56 to the elevator 47 after the previously loaded pallet 46 has been removed from the elevator. A motor 58 furnishes power both for the chains 57 and the chains 52.

At the left side of the pallet loader 30, immediately in front of the conveyor 34, there may be seen in Figure 1 a portion of a cabinet 59, that serves to house the major part of the above-described electric control mechanism, which governs the pattern in which the cartons are loaded on a pallet by the machine. When, as is frequently necessary, the machine must handle two or more different patterns, certain changes must of course be made in the wiring for each such pattern. We prefer to incorporate the circuit changes peculiar to each pattern in a separate box or cartridge within the cabinet 59, with provision for manual switching from one pattern cartridge to another when a change of pattern is desired.

The parts of the pallet loader 30 thus far described constitute the setting of the present invention, rather than the invention itself, and are already known to the art through commercial pallet loaders manufactured under said Bruce application Serial No. 5850. The foregoing description is therefore believed to be ample for the understanding of this invention, the features of which will now be described in greater detail.

In assembling a file of cartons on the loading platform 42, preparatory to ramming the file onto the stripper plate 45, it is necessary, of course, to stop the first carton in the file in a desired position at or near the right-hand end of the loading platform. For this purpose, the prior pallet loaders of the type under consideration provided a fixed carton stop. The present invention, in order to achieve the accurate centering desired, provides, in a similar location, the automatic carton stop 60, shown generally in Figure 1 and described in detail hereinafter in connection with Figures 2 to 8, inclusive. It is also necessary, for reasons that will be made clear later, to stop certain cartons in the files at predetermined positions along the loading platform 42, thereby serving to space the thus stopped carton a short distance from the preceding carton in the file. For this purpose, package spacers 61 and 62 are provided, as shown in Figure 1. The package spacers 61 and 62 are mounted between the rolls of the loading platform 42, and are normally lowered to an inoperative position, each being automatically raised to stopping position by a solenoid operated by the electric control mechanism when its services are required. Two of the rolls 43 of the loading platform 42 are removed in Figure 1, and part of the ram 44 is broken away, in order to show more clearly the construction of the package spacer 61 and its solenoid 63, the other spacer being similarly constructed.

In withdrawing the stripper plate 45 from beneath a layer of cartons loaded thereon, it is necessary to hold back the cartons from moving with the stripper plate. In the prior pallet loaders, this was accomplished by a fixed stripper bar, for which the present invention substitutes the automatic stripper bar 65, shown generally in Figure 1 at the top rear of the machine, and illustrated in detail in Figures 9 to 13.

Figures 14, 15, 16:
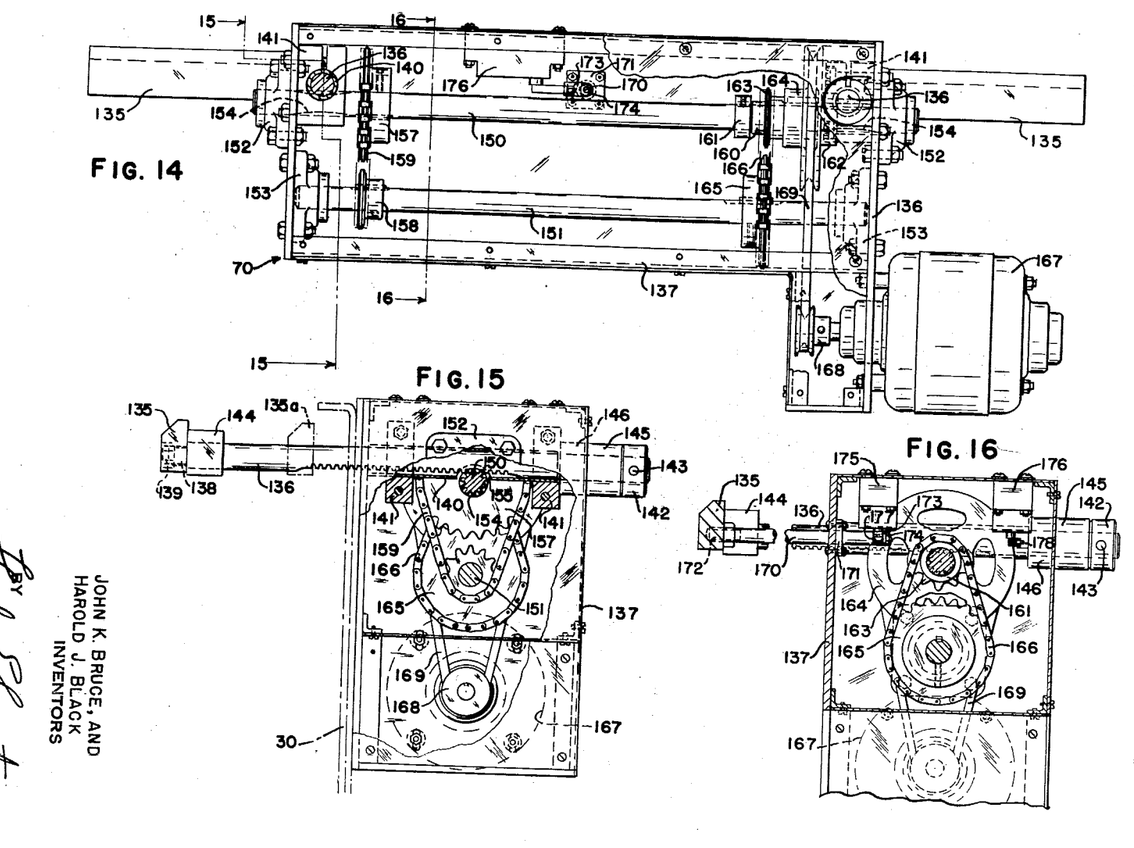
Figure 14 is a side elevation of the layer closer of the machine of Figure 1, with cover plate partially broken away.
Figure 15 is an end view thereof partially in section on the line 15—15 of Figure 14.
Figure 16 is a sectional view of the layer closer on the line 16—16 of Figure 14.

The present invention also provides a layer closer 70, one end of which can be seen in Figure 1 projecting in front of the layer of cartons on the stripper plate, and which is shown in detail in Figures 14, 15 and 16.

*Automatic carton stop*

It is frequently desired to load a run of packages of one size on pallets and then to change the machine over for a run of packages of another size, while using the same sized pallet for both runs. Obviously, the different sized packages may require different positions for centering each layer between the sides of the pallet. It is also sometimes desirable, in certain loading patterns, to offset the right and left hand edges of alternate layers. The purpose of the automatic carton stop 60 is to properly position each layer of containers between the right and left hand sides of the stripper plate 45, and therefore between the sides of the pallet being loaded.

Figures 2, 3, 4:
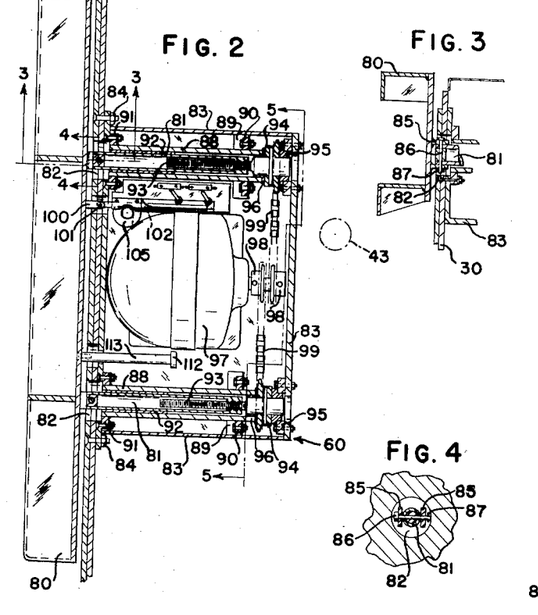
Figure 2 is a sectional view of the automatic carton stop of the machine of Figure 1, taken on the line 2—2 of Figure 5.
Figure 3 is a fragmentary sectional view thereof on the line 3—3 of Figure 2.
Figure 4 is a fragmentary sectional view on the line 4—4 of Figure 2.
Figure 5:
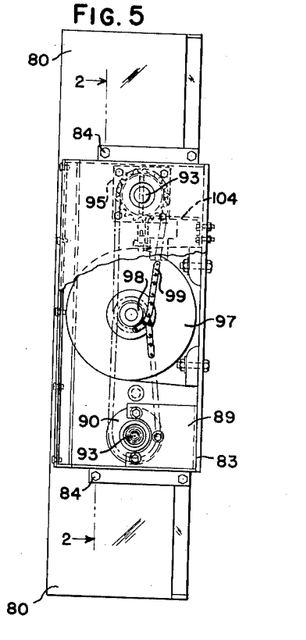
Figure 5 is a side elevation of said carton stop with a portion of the cover plate broken away.

Referring more particularly to Figures 2 to 8 inclusive, the carton stop 60 comprises a stop-bar 80, which is supported over the end of the loading platform 42 by means of the operating tubes 81 which project through holes 82 in the side of the pallet loader 30, and into a box-like frame or housing 83 of steel plates bolted and welded together in a conventional manner, and secured to the side of the machine 30 as by bolts 84. As shown in Figures 3 and 4, the stop-bar 80 may be provided with lugs or ears 85 secured thereto by butt welding or the like, and the operating tubes 81 may be connected to the ears 85 by pins 86 and cotter pins 87.

Within the housing 83, mounting tubes 88 are supported by brackets 89, 90 and 91, welded or bolted in conventional manner to housing 83 and tubes 88 respectively. Within mounting tubes 88 are tubular bearings 92 within which the operating tubes 81 are free to slide. Within operating tubes 81 are the operating screws 93. The operating tubes 81 are internally threaded for a portion of their length and cooperate with the operating screws 93 in a manner to be set forth. To the ends of the operating screws 93 exterior to support tubes 88 are affixed, in the usual manner, the chain sprockets 94 which in turn are supported by bearing rings 95 bolted to housing 83. A bearing member 96 may be interposed between sprockets 94 and support tube 88. Supported within housing 83 is a reversible motor 97 having two chain sprockets 98 affixed in conventional manner to the motor shaft. Each sprocket 94 is aligned with and driven by one of the sprockets 98 by means of a chain 99.

Affixed to stop-bar 80 by means of a bracket 100 thereon and pin 101, is a rack member 102 (Figures 2, 6, 7 and 8). Rack 102 is free to slide axially in the rack support member 103 which in turn is supported by bracket 104 bolted to housing 83. Also secured to bracket 104 is a potentiometer control unit 105 of known type, the spur gear 106 of which is adapted to cooperate with rack 102 through the cut out portion 107 of support 103. Limit switches 108 and 109 are also secured to bracket 104 so that the switch rollers 110 and 111 respectively thereof may be actuated by the upper edge of rack member 102. A mechanical stop 112 and guide rod 113 are also secured to stop-bar 80.

In operation the automatic carton stop 60 is responsive to the electrical control mechanism. For each layer of a preselected pattern, there is a corresponding position of the automatic carton stop. Each of the pattern control cartridges above described as housed in cabinet 59, is provided with a separate predetermined resistance for each desired position of the automatic carton stop 60. This predetermined resistance is automatically connected in circuit with the variable resistance of the potentiometer unit 105, in the manner of the well-known Wheatstone bridge. Should the resistance of the potentiometer, as determined by the position of rack 102 and gear 106, be different from that of the predetermined resistance, an electrical contact is established energizing the reversible motor 97. Motor 97, in turn, rotates the screws 93 by means of chains 99, the rotation of the screws 93 acting on the threaded portions of operating tubes 81 and extending them from, or withdrawing them into, support tubes 88 and thereby extending or withdrawing the stop-bar 80 from or toward the end of loading platform 42. As stop-bar 80 is extended or withdrawn, of course, rack 102 is moved within the support 103, thereby turning gear 106 and changing the setting of potentiometer 105 until it agrees with the predetermined resistance, whereupon the motor 97 is de-energized, and movement of the stop-plate 80 ceases.

Figure 6:
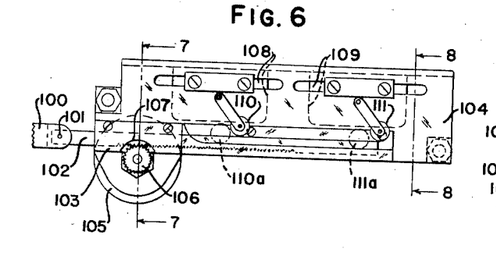
Figure 6 is an enlarged top plan view of the rack, potentiometer and limit switches thereof.
Figure 7:
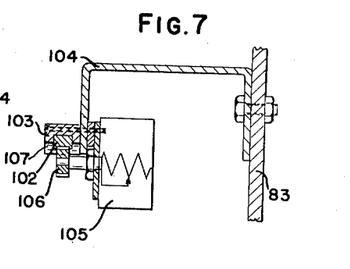
Figure 7 is a sectional view of the parts in Figure 6 on the line 7—7 thereof.
Figure 8:
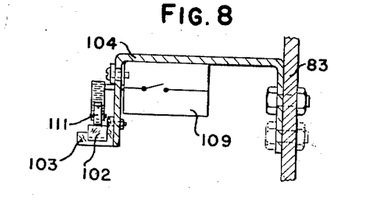
Figure 8 is a sectional view of the parts in Figure 6 on the line 8—8 thereof.

It will be apparent that by the use of this potentiometer control for motor 97, stop-plate 80 may be made to assume any position desired within the range or travel of the screws 93. It has been found that for pallets 40 x 48 inches in size, a range of travel of about four inches is sufficient for all practical purposes. Limit switches 108 and 109 are included in the motor circuits to limit the travel of rack 102, and hence the stop bar 80 and tubes 81, to within this range for safety reasons. In Figures 2, 6 and 8, the parts are shown in such position that the rack 102 is beyond the normal outward limit of its travel, and hence has engaged the roller 111 to lift it from its normal position shown in dotted lines at 111a and to open the limit switch 109 to break the circuit that energizes the reversible motor 97 to drive the stop bar 80 in the outward direction. The limit switch 108, on the contrary, is normally closed when its roller 110 is in the position of Figure 6, and is opened when, upon extreme inward movement of the stop bar, the roller 110 drops to the position shown in dotted lines at 110a. The other motor circuit is therefore still closed in Figure 6, permitting the motor to be energized by the control circuit to drive the stop bar 80 in the inward direction.

*Automatic stripper bar*

The purpose of the automatic stripper bar 65 of this invention is to provide means for accurately aligning the rear edge of each layer of cartons, so that when the layer is dropped on the pallet, it will occupy the desired position on the pallet with respect to the front and rear edges of the pallet. When the stripper plate 45 is withdrawn from under the layer of cartons, the cartons tend to move rearward with it, until they are stopped by contact with the stripper bar 65. In the above-mentioned Bruce application, the stripper bar is stationary, so that the rear edge of the layer of cartons always occupies the same position with respect to the rear edge of the pallet, regardless of the size of the cartons. According to the present invention, the stripper bar 65 is automatically moved to a predetermined position for each layer of cartons, thereby permitting each layer to be positioned as desired with respect to the front and rear edges of the pallet.

Figures 9, 11:
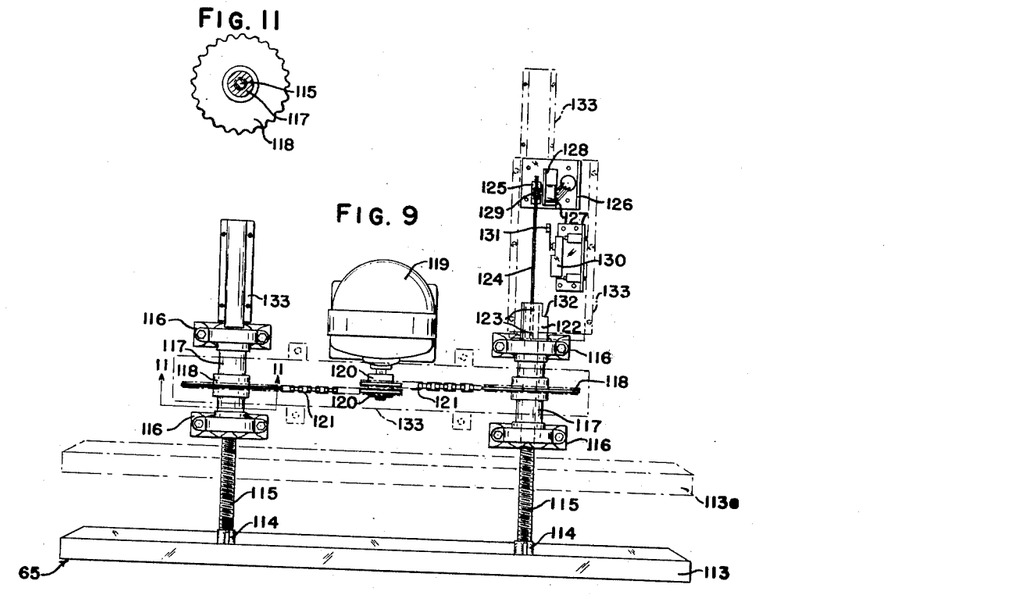
Figure 9 is a top plan view of the automatic stripper bar of the machine of Figure 1.
Figure 11 is a fragmentary sectional view on the line 11—11 of Figure 9.
Figure 10:
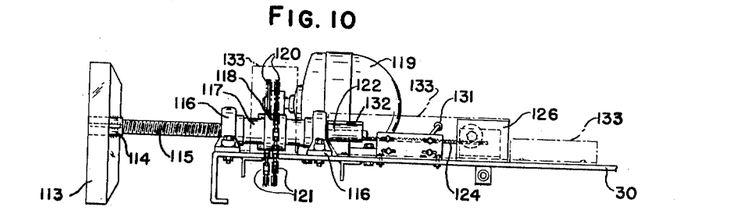
Figure 10 is a side elevation thereof.
Figure 12:
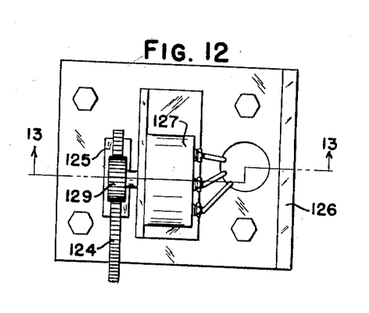
Figure 12 is an enlarged top plan view of the rack and potentiometer thereof.
Figure 13:
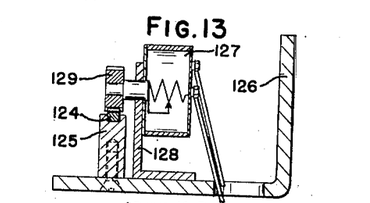
Figure 13 is a sectional view of the parts in Figure 12 on the line 13—13 thereof.

Figures 9 to 13 show the automatic stripper bar 65 in detail. A stripper bar stop-plate 113 is secured to and supported by two threaded control shafts or screws 115 by means of sockets 114 welded or otherwise affixed to plate 113. Control screws 115, in turn, are supported on pairs of pillow block bearings 116 which are bolted or otherwise secured to the rear top plate of the machine 30. On each screw 115, and extending between each pair of pillow blocks 116 (Figure 10), and journaled therein, is a sleeve 117 which is internally threaded to cooperate with the threads of screw 115. On each sleeve 117 is secured a sprocket 118. Between screws 115 and bolted or otherwise secured to the top of the pallet loader, is a reversible motor 119, to the shaft of which are secured two sprockets 120, each of which is aligned with a sprocket 118 and connected thereto by a chain 121. One of the screws 115 has an extension 122 joined thereto and to which is secured, by means of set screws 123, a rack 124. The rack 124 is supported by and slidable longitudinally within, a support block 125 (Figures 10, 12 and 13). Block 125 is joined to a support bracket 126 which may be bolted to the top of the machine 30. To bracket 126 is secured a potentiometer control unit 127 (similar to potentiometer unit 105), by means of the bracket 128, so that the spur gear 129 of potentiometer 127 cooperates with rack 124. Also mounted on the top of the loader 30 is a limit switch 130, the switch roller 131 of which is adapted to cooperate with a flange 132 on the shaft extension 122 (Figures 10 and 11). Conventional guards 133 may be provided for screws 115, rack extension 122, rack 124 and chains 121, respectively, the latter three guards having been indicated in broken lines for the sake of clarity.

The operation of the automatic stripper bar 65 is similar to that of the automatic carton stop 60, and is likewise responsive to the electrical control mechanism. For each layer of a preselected pattern, there is a corresponding position of the stripper bar 65, which position is slightly to the rear of the position in which the rear edge of the layer of cartons is left on the stripper plate 45 by the ram 44. It will be understood that, in ramming each file of cartons onto the stripper plate, the ram 44 moves rearward a constant distance beyond the rear edge of the loading platform 42, so that the ram always leaves the front edge of the completed layer in the same position on the stripper plate, regardless of carton size. The position of the rear edge of the completed layer on the stripper plate is accordingly variable, being dependent on carton size. By holding the rear edge of the layer as the stripper plate is withdrawn, so as to permit only a predetermined rearward movement of the layer, the automatic stripper bar 65 properly positions the layer with respect to the pallet to be loaded.

Each of the pattern control cartridges above described as housed in cabinet 59, is provided with a separate predetermined resistance for each desired position of the stripper bar 65. In the same manner as previously described for the automatic carton stop 60, this predetermined resistance cooperates with the potentiometer 127 to determine the energization of the reversible motor 119, and hence the position of the automatic stripper bar 65.

It will be apparent from the foregoing that as motor 119 is energized, the internally threaded sleeves 117 are rotated by means of sprockets 118 and 120 and chains 121. Axial movement of each sleeve 117 is prevented by pillow blocks 116 and rotation of each screw 115 is prevented by reason of being secured to the stop-plate 113, so that rotation of sleeves 117 causes screws 115 and hence stop-plate 113 to extend and retract between the positions indicated in full and broken lines in Figure 9. Rack 124 is likewise carried back and forth by extension 122, causing gear 129 to turn until potentiometer 127 reaches the position corresponding to the predetermined resistance contained in the control cartridge at 59, and motor 119 is then de-energized.

As a safety feature, roller 131 when struck by shoulder 132 of the extension 122 may actuate limit switch 130 to break the circuit to motor 119. Should the control mechanism fail, stop-plate 113 therefore will not be withdrawn so far as to cause damage to any working part.

*Layer closer*

As will be described in detail hereinafter, the use of the package spacers 61 and 62 leaves gaps in the layer of cartons as rammed onto the stripper plate. The layer closer 70 serves to close these gaps.

As shown in Figures 14, 15 and 16, the layer closer 70 comprises a closer bar 135 supported and manipulated by two actuator rods or racks 136, which project through and are operated by mechanism housed within the frame or housing 137. The housing 137 is secured to the left side of the pallet loader 30, and the racks 136 project through suitable openings in the left side wall thereof, so as to locate the closer bar 135 adjacent the left side of the stripper plate 45 when in its normal position (see Figure 1).

The inner ends of the racks 136 are secured to the closer bar 135 by means of reduced, threaded end portions 138 and lock nuts 139. The racks 136 are slidably mounted in support tubes 140, secured to the housing 137 by conventional split blocks 141 bolted to the housing. The outer end of each rack 136 is provided with a stop collar 142, secured thereto as by a rivet 143. Each rack 136 is also provided with an inboard grommet 144 and an outboard grommet 145, made of rubber or like resilient material, and which serve to cushion the noise and shock of stopping the rack at either extreme of its longitudinal movement. The inboard grommet 144 is adapted to contact the side wall of the machine 30 as the rack moves to its outer limit, and the outboard grommet 145 is adapted to contact a spacer 146 mounted on the rack adjacent the outer support block 141. The thickness of the spacer 146 is so chosen as to limit the inward movement of the rack 136 to the desired distance.

Within housing 137 at right angles to racks 136 are shafts 150 and 151 supported, respectively, by bearings 152 and 153 bolted to the housing. Shaft 150 is provided with toothed sections 154 adjacent either end, which cooperate with the teeth of the racks 136 (Figure 14), the rack support tube 140 being cut away at 155 (Figure 15) to permit this engagement. Adjacent one end of shaft 150 there is secured, in conventional manner, a sprocket 157 (Figure 14), and aligned therewith and secured to shaft 151 is sprocket 158, the two being connected by chain 159. Near the other end of shaft 150 is a sleeve 160 which is free to rotate independently on the shaft, and which is held against axial sliding movement by collars 161 and 162 secured on shaft 150. Mounted on and secured to sleeve 160, are the sprocket 163 and belt pulley 164. Aligned with sprocket 163 and keyed to shaft 151 is the sprocket 165. Chain 166 connects these two sprockets. A motor 167 is bolted to housing 137, and has a pulley 168 secured to its shaft in alignment with pulley 164, the two pulleys being connected by a belt 169.

Connected to closer bar 135, preferably midway between the racks 136, is the switch actuator rod 170 (Figures 14 and 16), which extends into the housing 137 and moves longitudinally with any extension or retraction of closer bar 135. A guide bearing 171 for rod 170 may be secured to housing 137. One end of rod 170 is threadedly connected to bar 135 as at 172 (Figure 16), and the other end is reduced and threaded so that the switch actuator plate 173 may be fastened thereto by means of nut 174. Limit switches 175 and 176 may be fastened by means of screws to housing 137 so that the rollers 177 and 178 thereof, respectively, are in the path of the switch actuator plate 173 as rod 170 slides axially in and out of the housing.

The operation of the layer closer is also governed by the electrical control mechanism. After the last file of cartons of a layer has been rammed onto the stripper plate and ram 44 has been withdrawn, an electrical contact may be made energizing the motor 167. Rotary motion is imparted successively through pulley 168, belt 169, pulley 164, sleeve 160, sprocket 163, chain 166, sprocket 165, shaft 151, sprocket 158, chain 159 and sprocket 157, to shaft 150. The reduction in each pair of pulleys or sprockets results in considerable mechanical advantage. Teeth 154 of shaft 150, engaging the teeth of the actuator racks 136, cause the racks to slide within tubes 140, carrying the closer bar 135 from the position in Figure 15 indicated in broken lines at 135a to the position shown in full lines. Cartons which have been laterally spaced from others in the layer due to the action of the spacer 61 or 62, are thus pushed against the remaining cartons to close the gap. The rod 170, being attached to closer bar 135, is pulled from within housing 137 until actuator plate 173 strikes roller 177 of the limit switch 175, which reverses the motor 167 and causes retraction of the closer bar 135. As the closer bar is retracted, rod 170 is pushed within housing 137 until actuator plate 173 strikes the roller 178 of the limit switch 176. Switch 176 operates a relay in the control cabinet 59 to break the electrical circuit to motor 167, which circuit is arranged to remain open until another layer of cartons has been pushed onto stripper plate 45, and the electrical control mechanism calls for re-energization of the motor.

It will be evident from the foregoing description that the positions of the limit switches 175 and 176 determine the normal range of movement of the closer bar 135, and that the use of only two such switches, as above described, permits only a single range of movement. This is sufficient for most installations, as all that is needed is to give the cartons near the left side of the stripper plate a slight push to close the small gaps left by the package spacer 61 or 62. Should more than one range of movement be required for different layer patterns, however, it will be apparent to those skilled in this art that this could be accomplished by the use of additional limit switches or of a potentiometer control such as that described above in connection with the automatic carton stop and stripper bar.

*Method of loading and positioning*

Figures 17, 18, 19, 20, 21, 22, 23, 24, 25, 26, 27, 28, 29:
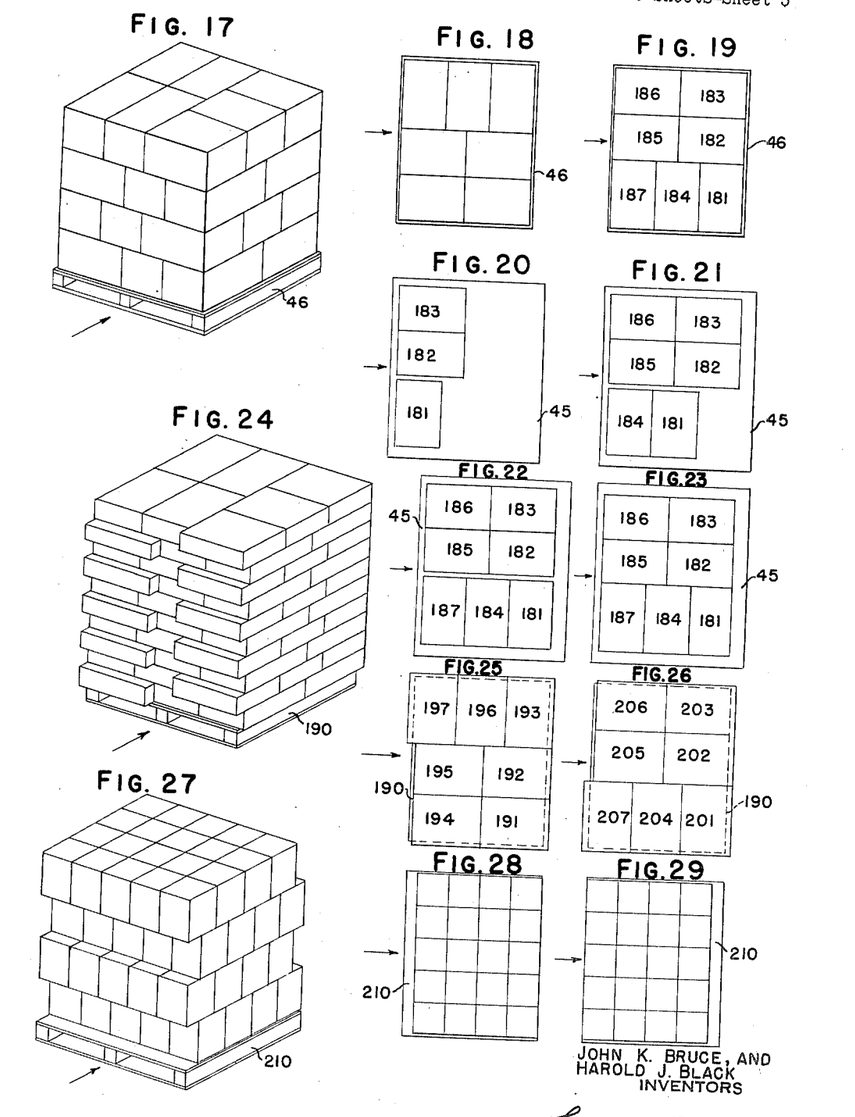
Figure 17 is a diagrammatical perspective view of a pallet loaded with rectangular-top containers.
Figure 18 is a diagrammatical plan view of the pallet of Figure 17 loaded with the first layer of containers.
Figure 19 is a diagrammatical plan view of the pallet of Figure 17 loaded with the second layer of containers.
Figure 20 is a diagrammatical plan view of the containers upon the stripper plate of the machine after the first ramming operation of the layer shown in Figure 19.
Figure 21 is a diagrammatical plan view of the containers upon the stripper plate of the machine after the second ramming operation of the layer shown in Figure 19.
Figure 22 is a diagrammatical plan view of the containers upon the stripper plate of the machine after the third ramming operation of the layer shown in Figure 19.
Figure 23 is a diagrammatical plan view of the containers upon the stripper plate of the machine after the closing operation of the layer shown in Figure 19.
Figure 24 is a diagrammatical perspective view of a pallet loaded with a different sized container from that shown in Figure 17.
Figure 25 is a diagrammatical plan view of the pallet loaded with the first layer of containers shown in Figure 24.
Figure 26 is a diagrammatical plan view of the pallet loaded with the second layer of containers shown in Figure 24.
Figure 27 is a diagrammatical perspective view of a pallet loaded with square-top containers.
Figure 28 is a diagrammatical plan view of a pallet loaded with the first layer of containers shown in Figure 27.
Figure 29 is a diagrammatical plan view of a pallet loaded with the second layer of containers shown in Figure 27.

Figure 17 shows the completely loaded pallet 46 removed from the pallet loader 30, the dimensions and stacking pattern of the cartons being the same as shown in Figure 1. The pallet 46 may be assumed to be the standard size of 40" x 48", which has been found to be very successful for use with the pallet loader 30, although, of course, the machine may be built to accommodate any desired size of pallet. The rectangular cartons shown in Figure 17 may be a standard size measuring 13¼" x 19¾" in top plan, so that the combined width of three cartons side by side is approximately the same as the total length of two cartons placed end to end. The load of Figure 17 consists of four layers of cartons, the top plan pattern of the first and third layers being shown in Figure 18, and of the second and fourth layers in Figure 19. Due to these alternating different layer patterns, the load of Figure 17 is nicely interlocked and hence stable.

With the carton size and the layer patterns just described, each layer measures approximately 40" x 46½" in top plan, allowing for slight irregularities. It will be evident that accurate centering of such layers is required when loading them on a 40" x 48" pallet. The manner of constructing these layers and centering them accurately on the pallet 46 will now be described.

Figures 20, 21, 22 and 23 illustrate the successive steps in forming and positioning the layer of Figure 19, which has the same pattern as that of the layer shown on the stripper plate 45 in Figure 1. In these figures, the seven cartons making up the layer are numbered from 181 through 187, in the order in which they enter the machine. As stated above, each carton, as it passes the electric eye 40, causes the counting chain of the electrical control mechanism to advance one step, thereby conditioning the pallet loader 30 to perform the required operations to produce the results about to be described. The controls for each carton are thus set up, in effect, by the preceding carton, which conditions the machine for the reception and disposition of the carton about to enter as soon as the preceding carton is out of the way.

The last carton of the preceding layer thus causes the raising of the entrance gate 39 in front of carton 181, which holds carton 181 back until the ram 44 has been advanced and withdrawn to its normal position and the carton stop 60 has been adjusted to its proper position for the layer about to be formed. The entrance gate 39 is then lowered, and carton 181 enters the loading platform 42 and is propelled along the platform until it is stopped by contacting the carton stop 60. In the meantime, rotate pin 37 is raised to engage carton 182 and rotate it 90°, and the package spacer 61 is raised in time to stop carton 182 and space it a short distance from the end of carton 181. Carton 183 is likewise rotated, and its passage past the electric eye 40 raises the entrance gate 39 to hold back carton 184. While this has been going on, the stripper plate 45 has been withdrawn to deposit the previous layer of cartons on the pallet 46, the pallet has been lowered by the elevator 47, and the stripper plate returned to its normal position, whereupon the stripper bar 65 is automatically adjusted to its proper position for the layer about to be formed. The file of cartons 181, 182 and 183 being complete on the loading platform 42, the ram 44 is operated to push cartons 181, 182 and 183 onto the stripper plate 45, where they assume the positions shown in Figure 20, and the ram is then retracted. The arrows in Figure 20 and in the other figures on the same sheet, indicate the direction of operation of the ram. The ram 44 is sufficiently high to operate over the package spacer 61 without interfering with it, and the gate 39 and the spacer 61 are lowered to their inoperative positions after the return of the ram.

Carton 184 enters the machine without having been rotated, and, like carton 181, travels down the platform 42 until it encounters carton stop 60. Cartons 185 and 186, like cartons 182 and 183, are rotated through 90° and are held back by the package spacer 61. The entrance gate 39 having been raised after carton 186 enters the machine, the ram 44 is advanced and withdrawn as before, leaving the six cartons on the stripper plate 45 in the positions shown in Figure 21.

From a comparison of Figures 20 and 21, it will be evident that carton 185 has to move past the end of carton 184 and, particularly, past the corner of carton 181 in order to reach the position shown in Figure 21. The package spacer 61 is used to provide the space illustrated, in order to prevent the corner of carton 181 from interfering with the advance of cartons 185 and 186, should the cartons be slightly mis-aligned.

After the return of ram 44, the spacer 61 is retracted and the gate 39 is lowered to permit carton 187 alone to enter the machine, the gate being again raised immediately thereafter. When carton 187, which is not rotated, reaches the end of the loading platform 42, the ram is again operated to push it and cartons 184 and 181 into the positions shown in Figure 22. The gap left by the package spacer 61 here serves again to prevent interference during the movement of the cartons past one another.

The layer closer 70 may now be operated to push cartons 182, 183, 185 and 186 toward cartons 181, 184 and 187, thus closing the gap left by the spacer 61 as shown in Figure 23.

The automatic stripper bar 65 having been previously adjusted as above described, the machine is now ready for the retraction of the stripper plate 45, with the consequent deposit of the completely formed layer shown in Figure 23 on the pallet 46 being loaded. In Figure 1, the machine is shown just as the stripper plate has commenced this withdrawal, to drop the second layer consisting of cartons 181—187 on the layer previously deposited on pallet 46. It will be understood that the first rearward movement of stripper plate 45 carries the layer of cartons back with it until cartons 181, 182 and 183 engage the stripper bar 65 as shown in Figure 1, thereby correctly positioning the layer with respect to the ends of pallet 46.

As soon as the ram 44 has returned after ramming carton 187 on the stripper plate, the gate 39 is lowered, and the carton 31, having been turned by the rotate pin 37, enters the machine to constitute the first carton of a third layer patterned as shown in Figure 18. The manner of forming this layer will be evident from that just described, the package spacer 62 being used in lieu of spacer 61 to space the third carton in the file, which is not rotated, from carton 31 and the succeeding carton, both of which are rotated.

Figure 24 illustrates a stacking situation that arises when the cartons are not so conveniently proportioned as the cartons of Figure 17. The cartons illustrated in Figure 24 are a standard size measuring 14½" x 20½" in top plan, and hence the overall size of the layers is approximately 43½" x 49½", which is somewhat larger than the standard 40" x 48" size of the pallet 190 of Figure 24. The pallet loader 30 is preferably so constructed that it will accommodate an overhang at each side of at least 2" without interference with the elevator screws 48, or an overall layer width of 52", and hence the 49½" dimension just mentioned is entirely satisfactory. It will be evident, however, that such a layer size does require accurate positioning of the load on the pallet 190 so that the load may pass through the machine 30 without fouling. The overhang at the ends of the pallet 190 occasioned by the 43½" layer dimension raises no clearance problem in the machine, but accurate endwise positioning of the load is necessary in order to produce a balanced load on the pallet 190 and avoid undue strain on the elevator mechanism. These positioning problems may be solved by arranging the alternate layers of Figure 24 with respect to the pallet 190 as shown in top plan for the respective layers in Figures 25 and 26.

Cartons 191, 192 and 193 of Figure 25 are first assembled on the loading platform 42 and then rammed onto the stripper plate 45 in the manner described above in connection with Figure 20. The second ramming operation pushes cartons 194, 195 and 196 onto the stripper plate, carton 196 being spaced from carton 195 by the use of the package spacer 62, suitably relocated for the purpose, in order that carton 196 may clear the corner of carton 192. Carton 197, likewise stopped by the spacer 62, is then pushed onto the stripper plate by the third ramming operation, after which the layer closer 70 is operated to close the gaps as before.

In forming the second layer shown in Figure 26, and the other even numbered layers, the first ramming operation pushes cartons 201, 202 and 203 on the stripper plate; the second ramming operation pushes cartons 204, 205 and 206; and the third pushes carton 207. In loading this second layer, the spacer 61, suitably relocated, is used to space cartons 202 and 205 from cartons 201 and 204, respectively, for the same purpose above described.

It will be understood that the carton stop 60 and the stripper bar 65 are properly positioned by the electrical control mechanism in advance of forming the layers of Figures 25 and 26, so as to center the layers on the pallet 190 as shown in those figures, thereby producing an evenly balanced load as illustrated.

With square-top cartons, a somewhat different stacking arrangement is desirable, such as shown in Figure 27 for cartons measuring 9" on a side. In the case of square-top cartons, there is, of course, no necessity for using the rotate pin 37, the spacers 61 and 62, or the layer closer 70. Each ramming operation pushes a uniform file of five cartons onto the stripper plate 45. The automatic carton stop 60 has the same position for both alternate layers shown in Figures 28 and 29, and serves to center the layers with respect to the sides of the pallet 210 as shown therein. The automatic stripper bar 65 has a different position for each of these respective layers, and offsets the layers alternately as illustrated in Figures 27, 28 and 29, to form a stable, interlocking load.

It will be evident that loads of square-topped containers may also be interlocked by staggering the alternate layers from side to side of the pallet 210 by means of the automatic carton stop 60. Loads may also be doubly staggered, from side to side, as well as from front to rear.

While we have herein described, and in the drawings shown, illustrative embodiments of our invention, it is to be understood that the invention is not limited thereto, but may comprehend other constructions, arrangement of parts, details and features without departing from the spirit of the invention. We desire to be limited, therefore, only by the scope of the appended claims.

We claim:

1. In a pallet loading machine of the type having a loading platform adapted to propel cartons entering the machine in single file toward the end of said platform, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of layer positioning means comprising a carton stop located adjacent the end of said loading platform, power-operated means operably connected to said carton stop for moving said carton stop to preselected positions with respect to the end of said loading platform, whereby cartons rammed onto said stripper plate from said platform may be positioned on said stripper plate in predetermined relation to the sides of said pallet, a stripper bar located adjacent the end of said stripper plate toward which said plate is retracted, power-operated means operably connected to said stripper bar for moving said stripper bar to preselected positions with respect to said end of said stripper plate, whereby cartons may be positioned in predetermined relation to the ends of said pallet when said stripper plate is retracted, and means controlled by said electrical control mechanism for automatically energizing said power-operated means to adjust said carton stop and said stripper bar to appropriate preselected positions for each layer of cartons formed on said stripper plate.

2. In a pallet loading machine of the type having an entering conveyor discharging onto a loading platform adapted to propel cartons entering the machine in single file toward the end of said platform, means located in advance of said loading platform for rotating preselected cartons through 90°, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of layer positioning means comprising a carton stop located adjacent the end of said loading platform, power-operated means operably connected to said carton stop for moving said carton stop to preselected positions with respect to the end of said loading platform, whereby cartons rammed onto said stripper plate from said platform may be positioned on said stripper plate in predetermined relation to the sides of said pallet, retractable means located along said loading platform to stop preselected cartons at predetermined points along said loading platform, thereby spacing a thus stopped carton a short distance from the preceding carton in the file of cartons on the loading platform, a stripper bar located adjacent the end of said stripper plate toward which said plate is retracted, power-operated means operably connected to said stripper bar for moving said stripper bar to preselected positions with respect to said end of said stripper plate, whereby cartons may be positioned in predetermined relation to the ends of said pallet when said stripper plate is retracted, means controlled by said electrical control mechanism for automatically energizing said power-operated means to adjust said carton stop and said stripper bar to appropriate preselected positions for each layer of cartons formed on said stripper plate, a layer closer located adjacent one side of said stripper plate, power-operated means operably connected to said layer closer for advancing said layer closer a predetermined distance to close the gaps in a layer of cartons left by said carton spacing means and for retracting said layer closer to its normal position, and means controlled by said electrical control mechanism for automatically energizing said last-named power-operated means prior to the retraction of said stripper plate, whereby a layer of cartons on the stripper plate may be closely packed together before depositing said layer on the pallet.

3. In a pallet loading machine of the type having a loading platform adapted to propel cartons entering the machine in single file toward the end of said platform, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of a stripper bar located adjacent the end of said stripper plate toward which said plate is retracted, power-operated means operably connected to said stripper bar for moving said stripper bar to preselected positions with respect to said end of said stripper plate, whereby cartons may be positioned in predetermined relation to the ends of said pallet when said stripper plate is retracted, and means controlled by said electrical control mechanism for automatically energizing said power-operated means to adjust said stripper bar to an appropriate preselected position for each layer of cartons formed on said stripper plate.

4. In a pallet loading machine of the type having an entering conveyor discharging onto a loading platform adapted to propel cartons entering the machine in single file toward the end of said platform, means located in advance of said loading platform for rotating preselected cartons through 90°, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of a carton stop located adjacent the end of said loading platform and retractable carton spacing means located along said loading platform to stop preselected cartons at predetermined points along said loading platform, whereby cartons rammed onto said stripper plate from said platform may be positioned on said stripper plate in predetermined relation to the sides of said pallet and at a predetermined spacing from each other, a layer closer located adjacent one side of said stripper plate, power-operated means operably connected to said layer closer for advancing said layer closer a predetermined distance to close the gaps in a layer of cartons left by said carton spacing means and for retracting said layer closer to its normal position, and means controlled by said electrical control mechanism for automatically energizing said power-operated means prior to the retraction of said stripper plate, whereby a layer of cartons on the stripper plate may be closely packed together before depositing said layer on the pallet.

5. In a pallet loading machine of the type having an entering conveyor discharging onto a loading platform adapted to propel cartons entering the machine in single file toward the end of said platform, means located in advance of said loading platform for rotating preselected cartons through 90°, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of layer centering means comprising a carton stop located adjacent the end of said loading platform, power-operated means operably connected to said carton stop for moving said carton stop to preselected positions with respect to the end of said loading platform, a stripper bar located adjacent the end of said stripper plate toward which said plate is retracted, power-operated means operably connected to said stripper bar for moving said stripper bar to preselected positions with respect to said end of said stripper plate, and means controlled by said electrical control mechanism for automatically energizing said power-operated means to adjust said carton stop and said stripper bar to appropriate preselected positions for each layer of cartons formed on said stripper plate, whereby alternate layers of cartons having cartons differently rotated to form interlocking layer patterns, may be successively deposited on said pallet in properly centered positions.

6. In a pallet loading machine of the type having a loading platform adapted to propel cartons entering the machine in single file toward the end of said platform, a stripper plate, a ram for pushing cartons from said platform to said plate, elevator means for supporting a pallet at selected distances below the normal position of said stripper plate, said stripper plate being retractable to deposit a layer of cartons on said pallet, and electrical control mechanism comprising a counting chain progressively stepped by the entrance of each carton into the machine, the combination of a stripper bar located adjacent the end of said stripper plate toward which said plate is retracted, power-operated means operably connected to said stripper bar for moving said stripper bar to preselected positions with respect to said end of said stripper plate, and means controlled by said electrical control mechanism for automatically energizing said power-operated means to adjust said stripper bar to an appropriate preselected position for each layer of cartons formed on said stripper plate, whereby alternate layers of substantially square-topped cartons may be successively deposited on said pallet in properly offset positions to form interlocking layers.

References Cited in the file of this patent

UNITED STATES PATENTS

| | | |
|---|---|---|
| 2,544,735 | Strickler | Mar. 13, 1951 |
| 2,633,251 | Bruce | Mar. 31, 1953 |